United States Patent
Yang et al.

(10) Patent No.: US 9,924,530 B2
(45) Date of Patent: Mar. 20, 2018

(54) DATA TRANSMISSION METHOD, APPARATUS, AND SYSTEM

(71) Applicant: HUAWEI TECHNOLOGIES CO., LTD., Shenzhen (CN)

(72) Inventors: Xiaodong Yang, Beijing (CN); Wei Quan, Beijing (CN); Jian Zhang, Beijing (CN); Zhenxing Hu, Shenzhen (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/331,102

(22) Filed: Oct. 21, 2016

(65) Prior Publication Data
US 2017/0041944 A1 Feb. 9, 2017

Related U.S. Application Data

(63) Continuation of application No. PCT/CN2014/076022, filed on Apr. 23, 2014.

(51) Int. Cl.
*H04W 72/00* (2009.01)
*H04W 4/00* (2009.01)
(Continued)

(52) U.S. Cl.
CPC ....... *H04W 72/1268* (2013.01); *H04W 24/10* (2013.01); *H04W 28/0236* (2013.01);
(Continued)

(58) Field of Classification Search
CPC ......... H04W 72/1268; H04W 72/1242; H04W 72/1247; H04W 28/0236; H04W 28/0257
(Continued)

(56) References Cited

U.S. PATENT DOCUMENTS

2007/0026868 A1* 2/2007 Schulz ............... H04M 3/2227
455/454
2010/0246506 A1* 9/2010 Krishnaswamy ... H04W 72/085
370/329
(Continued)

FOREIGN PATENT DOCUMENTS

CN 101534508 9/2009
CN 102833796 12/2012
(Continued)

OTHER PUBLICATIONS

3GPP TS 36.321 V12.1.9 Mar. 2014.*
(Continued)

*Primary Examiner* — William Nealon
(74) *Attorney, Agent, or Firm* — Staas & Halsey LLP

(57) ABSTRACT

A data transmission method, apparatus, and system are provided, where the method includes: receiving, by user equipment, a data scheduling request sent by a base station, where the data scheduling request carries resource information allocated to scheduled data by the base station, and the resource information includes an unlicensed spectrum resource; determining whether a condition for transmission of the scheduled data on an unlicensed spectrum is met; and if the condition for transmission of the scheduled data on the unlicensed spectrum is met, sending the scheduled data to the base station by using the unlicensed spectrum resource. In the present invention, data transmission reliability can be improved.

14 Claims, 5 Drawing Sheets

(51) Int. Cl.
*H04W 72/12* (2009.01)
*H04W 24/10* (2009.01)
*H04W 28/02* (2009.01)

(52) U.S. Cl.
CPC ... *H04W 28/0257* (2013.01); *H04W 72/1242* (2013.01); *H04W 72/1247* (2013.01)

(58) Field of Classification Search
USPC ......................................................... 455/450
See application file for complete search history.

(56) References Cited

U.S. PATENT DOCUMENTS

| | | | |
|---|---|---|---|
| 2012/0250631 A1* | 10/2012 | Hakola | H04L 5/001 370/329 |
| 2013/0155991 A1* | 6/2013 | Kazmi | H04W 72/0453 370/329 |
| 2013/0343288 A1 | 12/2013 | Ratasuk et al. | |
| 2014/0056245 A1* | 2/2014 | Qin | H04W 36/0088 370/329 |
| 2014/0362780 A1* | 12/2014 | Malladi | H04W 16/14 370/329 |

FOREIGN PATENT DOCUMENTS

| | | |
|---|---|---|
| CN | 103168491 | 6/2013 |
| EP | 1641296 | 3/2006 |
| GB | 2477649 | 8/2011 |

OTHER PUBLICATIONS

International Search Report dated Jan. 30, 2015 in corresponding International Application No. PCT/CN2014/076022.
International Search Report, dated Jan. 30, 2015, in International Application No. PCT/CN2014/076022 (4 pp.).
Written Opinion of the International Searching Authority, dated Jan. 30, 2015, in International Application No. PCT/CN2014/076022 (7 pp.).
Extended European Search Report, dated Mar. 10, 2017, in European Application No. 14889807.5 (9 pp.).
Ratasuk, R. et al., License-Exempt LTE Deployment in Heterogeneous Network, 2012 IEEE, XP32263759, pp. 246-250.

* cited by examiner

DATA TRANSMISSION METHOD, APPARATUS, AND SYSTEM

CROSS-REFERENCE TO RELATED APPLICATIONS

This application is a continuation of International Application No. PCT/CN2014/076022, filed on Apr. 23, 2014, the disclosure of which is hereby incorporated by reference in its entirety.

TECHNICAL FIELD

The present invention relates to the field of communications technologies, and in particular, to a data transmission method, apparatus, and system.

BACKGROUND

In the communications field, a spectrum resource may be generally classified into a licensed spectrum and an unlicensed spectrum. The licensed spectrum has strict restriction and protection, and allows only a authorized device to access and use. However, the unlicensed spectrum is an open spectrum resource, and can be accessed and used by different devices. Currently, as a user requires more mobile broadband, an existing licensed spectrum cannot completely meet the use's communication requirement, while frequency band utilization of the unlicensed spectrum is relatively low. Therefore, the industry gradually starts to use the unlicensed spectrum to share a communication requirement of the licensed spectrum in the industry.

In actual communication, some data (such as a measurement report) sent by user equipment to a base station is crucial. Because the unlicensed spectrum is an open and uncontrollable spectrum resource, and relatively strong interference exists between data transmitted on the unlicensed spectrum, if the data is transmitted by using the unlicensed spectrum, the data transmitted on the unlicensed spectrum is easily lost or damaged, and data transmission reliability is reduced.

SUMMARY

Embodiments of the present invention disclose a data transmission method, apparatus, and system, to improve data transmission reliability.

A first aspect of the embodiments of the present invention discloses user equipment, including:

a receiving unit, configured to receive a data scheduling request sent by a base station, where the data scheduling request includes resource information allocated to scheduled data by the base station, and the resource information includes an unlicensed spectrum resource;

a determining unit, configured to determine whether a condition for transmission of the scheduled data on an unlicensed spectrum is met, where the scheduled data is scheduled according to the data scheduling request received by the receiving unit; and a sending unit, configured to: when a determining result of the determining unit is that the condition for transmission of the scheduled data on the unlicensed spectrum is met, send the scheduled data to the base station by using the unlicensed spectrum resource.

With reference to the first aspect of the embodiments of the present invention, in a first possible implementation manner of the first aspect of the embodiments of the present invention, the determining unit includes:

a first obtaining subunit, configured to obtain a priority level of the scheduled data, where the scheduled data is scheduled according to the data scheduling request received by the receiving unit; and a first determining subunit, configured to determine whether the priority level obtained by the first obtaining subunit is less than a preset level threshold, where if the priority level is less than the preset level threshold, the condition for transmission of the scheduled data on the unlicensed spectrum is met.

With reference to the first aspect of the embodiments of the present invention, in a second possible implementation manner of the first aspect of the embodiments of the present invention, the determining unit includes:

a second obtaining subunit, configured to obtain a transmission delay of a radio bearer channel carrying the scheduled data, where the scheduled data is scheduled according to the data scheduling request received by the receiving unit; and a second determining subunit, configured to determine whether the transmission delay obtained by the second obtaining subunit is greater than or equal to a preset maximum delay, where if the transmission delay is greater than or equal to the preset maximum delay, the condition for transmission of the scheduled data on the unlicensed spectrum is met.

With reference to the first aspect of the embodiments of the present invention, in a third possible implementation manner of the first aspect of the embodiments of the present invention, the determining unit includes:

a third obtaining subunit, configured to obtain a maximum bit rate at which the scheduled data is transmitted on a radio bearer channel carrying the scheduled data, where the scheduled data is scheduled according to the data scheduling request received by the receiving unit; and a third determining subunit, configured to determine whether the maximum bit rate obtained by the third obtaining subunit is less than a preset maximum bit rate, where if the maximum bit rate is less than the preset maximum bit rate, the condition for transmission of the scheduled data on the unlicensed spectrum is met.

With reference to the first aspect of the embodiments of the present invention, in a fourth possible implementation manner of the first aspect of the embodiments of the present invention, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report; and the determining unit is specifically configured to determine whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

With reference to the first aspect of the embodiments of the present invention, in a fifth possible implementation manner of the first aspect of the embodiments of the present invention, in terms of a radio bearer, the scheduled data includes signaling radio bearer data and data radio bearer data, and the signaling radio bearer data includes a measurement report of the user equipment; and the determining unit is specifically configured to determine whether the scheduled data is the measurement report of the user equipment, where if the scheduled data is not the measurement report of the user equipment, the condition for transmission of the scheduled data on the unlicensed spectrum is met.

With reference to any one of the first aspect of the embodiments of the present invention, or the first to the fifth possible implementation manners of the first aspect of the embodiments of the present invention, in a sixth possible implementation manner of the first aspect of the embodiments of the present invention, the sending unit is further configured to: when the determining result of the determining unit is that the condition for transmission of the scheduled data on the unlicensed spectrum is not met, and the data scheduling request is sent to the user equipment by the base station by using the unlicensed spectrum, send indication information to the base station by using the unlicensed spectrum resource, where the indication information is used to indicate that the scheduled data is sent to the base station without using the unlicensed spectrum, or is used to indicate information about a reason for sending the scheduled data without using the unlicensed spectrum.

A second aspect of the embodiments of the present invention discloses user equipment, including a memory and a processor, where the memory stores a set of program code, and the processor is configured to invoke the program code stored in the memory to perform the following operations:

receiving a data scheduling request sent by a base station, where the data scheduling request includes resource information allocated to scheduled data by the base station, and the resource information includes an unlicensed spectrum resource;

determining whether a condition for transmission of the scheduled data on an unlicensed spectrum is met; and if the condition for transmission of the scheduled data on the unlicensed spectrum is met, sending the scheduled data to the base station by using the unlicensed spectrum resource.

With reference to the second aspect of the embodiments of the present invention, in a first possible implementation manner of the second aspect of the embodiments of the present invention, a manner of the determining, by the processor, whether a condition for transmission of the scheduled data on an unlicensed spectrum is met is specifically:

obtaining a priority level of the scheduled data; and determining whether the priority level is less than a preset level threshold, where if the priority level is less than the preset level threshold, the condition for transmission of the scheduled data on the unlicensed spectrum is met.

With reference to the second aspect of the embodiments of the present invention, in a second possible implementation manner of the second aspect of the embodiments of the present invention, a manner of the determining, by the processor, whether a condition for transmission of the scheduled data on an unlicensed spectrum is met is specifically:

obtaining a transmission delay of a radio bearer channel carrying the scheduled data; and determining whether the transmission delay is greater than or equal to a preset maximum delay, where if the transmission delay is greater than or equal to the preset maximum delay, the condition for transmission of the scheduled data on the unlicensed spectrum is met.

With reference to the second aspect of the embodiments of the present invention, in a third possible implementation manner of the second aspect of the embodiments of the present invention, a manner of the determining, by the processor, whether a condition for transmission of the scheduled data on an unlicensed spectrum is met is specifically:

obtaining a maximum bit rate at which the scheduled data is transmitted on a radio bearer channel carrying the scheduled data; and determining whether the maximum bit rate is less than a preset maximum bit rate, where if the maximum bit rate is less than the preset maximum bit rate, the condition for transmission of the scheduled data on the unlicensed spectrum is met.

With reference to the second aspect of the embodiments of the present invention, in a fourth possible implementation manner of the second aspect of the embodiments of the present invention, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report; and a manner of the determining, by the processor, whether a condition for transmission of the scheduled data on an unlicensed spectrum is met is specifically:

determining whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

With reference to the second aspect of the embodiments of the present invention, in a fifth possible implementation manner of the second aspect of the embodiments of the present invention, in terms of a radio bearer, the scheduled data includes signaling radio bearer data and data radio bearer data, and the signaling radio bearer data includes a measurement report of the user equipment; and a manner of the determining, by the processor, whether a condition for transmission of the scheduled data on an unlicensed spectrum is met is specifically:

determining whether the scheduled data is the measurement report of the user equipment, where if the scheduled data is not the measurement report of the user equipment, the condition for transmission of the scheduled data on the unlicensed spectrum is met.

With reference to any one of the second aspect of the embodiments of the present invention, or the first to the fifth possible implementation manners of the second aspect of the embodiments of the present invention, in a sixth possible implementation manner of the second aspect of the embodiments of the present invention, the processor further performs the following operations:

if the condition for transmission of the scheduled data on the unlicensed spectrum is not met, and the data scheduling request is sent to the user equipment by the base station by using the unlicensed spectrum, sending indication information to the base station by using the unlicensed spectrum resource, where the indication information is used to indicate that the scheduled data is sent to the base station without using the unlicensed spectrum, or is used to indicate information about a reason for sending the scheduled data without using the unlicensed spectrum.

A third aspect of the embodiments of the present invention discloses a data transmission method, including:

receiving, by user equipment, a data scheduling request sent by a base station, where the data scheduling request includes resource information allocated to scheduled data by the base station, and the resource information includes an unlicensed spectrum resource;

determining, by the user equipment, whether a condition for transmission of the scheduled data on an unlicensed spectrum is met; and if the condition for transmission of the scheduled data on the unlicensed spectrum is met, sending, by the user equipment, the scheduled data to the base station by using the unlicensed spectrum resource.

With reference to the third aspect of the embodiments of the present invention, in a first possible implementation manner of the third aspect of the embodiments of the present invention, the determining, by the user equipment, whether a condition for transmission of the scheduled data on an unlicensed spectrum is met includes:

obtaining, by the user equipment, a priority level of the scheduled data; and determining, by the user equipment, whether the priority level is less than a preset level threshold, where if the priority level is less than the preset level threshold, the condition for transmission of the scheduled data on the unlicensed spectrum is met.

With reference to the third aspect of the embodiments of the present invention, in a second possible implementation manner of the third aspect of the embodiments of the present invention, the determining, by the user equipment, whether a condition for transmission of the scheduled data on an unlicensed spectrum is met includes:

obtaining, by the user equipment, a transmission delay of a radio bearer channel carrying the scheduled data; and determining, by the user equipment, whether the transmission delay is greater than or equal to a preset maximum delay, where if the transmission delay is greater than or equal to the preset maximum delay, the condition for transmission of the scheduled data on the unlicensed spectrum is met.

With reference to the third aspect of the embodiments of the present invention, in a third possible implementation manner of the third aspect of the embodiments of the present invention, the determining, by the user equipment, whether a condition for transmission of the scheduled data on an unlicensed spectrum is met includes:

obtaining, by the user equipment, a maximum bit rate at which the scheduled data is transmitted on a radio bearer channel carrying the scheduled data; and determining, by the user equipment, whether the maximum bit rate is less than a preset maximum bit rate, where if the maximum bit rate is less than the preset maximum bit rate, the condition for transmission of the scheduled data on the unlicensed spectrum is met.

With reference to the third aspect of the embodiments of the present invention, in a fourth possible implementation manner of the third aspect of the embodiments of the present invention, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report; and the determining, by the user equipment, whether a condition for transmission of the scheduled data on an unlicensed spectrum is met includes:

determining, by the user equipment, whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

With reference to the third aspect of the embodiments of the present invention, in a fifth possible implementation manner of the third aspect of the embodiments of the present invention, in terms of a radio bearer, the scheduled data includes signaling radio bearer data and data radio bearer data, and the signaling radio bearer data includes a measurement report of the user equipment; and the determining, by the user equipment, whether a condition for transmission of the scheduled data on an unlicensed spectrum is met includes:

determining, by the user equipment, whether the scheduled data is the measurement report of the user equipment, where if the scheduled data is not the measurement report of the user equipment, the condition for transmission of the scheduled data on the unlicensed spectrum is met.

With reference to any one of the third aspect of the embodiments of the present invention, or the first to the fifth possible implementation manners of the third aspect of the embodiments of the present invention, in a sixth possible implementation manner of the third aspect of the embodiments of the present invention, the method further includes:

if the condition for transmission of the scheduled data on the unlicensed spectrum is not met, and the data scheduling request is sent to the user equipment by the base station by using the unlicensed spectrum, sending, by the user equipment, indication information to the base station by using the unlicensed spectrum resource, where the indication information is used to indicate that the scheduled data is sent to the base station without using the unlicensed spectrum, or is used to indicate information about a reason for sending the scheduled data without using the unlicensed spectrum.

A fourth aspect of the embodiments of the present invention discloses a data transmission system, including a base station and user equipment, where the base station is configured to send a data scheduling request to the user equipment, where the data scheduling request includes resource information allocated to scheduled data by the base station, and the resource information includes an unlicensed spectrum resource;

the user equipment is configured to: receive the data scheduling request sent by the base station, determine whether a condition for transmission of the scheduled data on an unlicensed spectrum is met, and if the condition for transmission of the scheduled data on the unlicensed spectrum is met, send the scheduled data to the base station by using the unlicensed spectrum resource; and the base station is further configured to receive the scheduled data sent by the user equipment by using the unlicensed spectrum resource.

With reference to the fourth aspect of the embodiments of the present invention, in a first possible implementation manner of the fourth aspect of the embodiments of the present invention, a manner in which the user equipment determines whether the condition for transmission of the scheduled data on the unlicensed spectrum is met is specifically:

the user equipment is configured to obtain a priority level of the scheduled data, and determine whether the priority level is less than a preset level threshold, where if the priority level is less than the preset level threshold, the condition for transmission of the scheduled data on the unlicensed spectrum is met.

With reference to the fourth aspect of the embodiments of the present invention, in a second possible implementation manner of the fourth aspect of the embodiments of the present invention, a manner in which the user equipment determines whether the condition for transmission of the scheduled data on the unlicensed spectrum is met is specifically:

the user equipment is configured to obtain a transmission delay of a radio bearer channel carrying the scheduled data, and determine whether the transmission delay is greater than or equal to a preset maximum delay, where if the transmission delay is greater than or equal to the preset maximum delay, the condition for transmission of the scheduled data on the unlicensed spectrum is met.

With reference to the fourth aspect of the embodiments of the present invention, in a third possible implementation manner of the fourth aspect of the embodiments of the present invention, a manner in which the user equipment determines whether the condition for transmission of the scheduled data on the unlicensed spectrum is met is specifically:

the user equipment is configured to obtain a maximum bit rate at which the scheduled data is transmitted on a radio bearer channel carrying the scheduled data, and determine whether the maximum bit rate is less than a preset maximum bit rate, where if the maximum bit rate is less than the preset maximum bit rate, the condition for transmission of the scheduled data on the unlicensed spectrum is met.

With reference to the fourth aspect of the embodiments of the present invention, in a fourth possible implementation manner of the fourth aspect of the embodiments of the present invention, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report; and a manner in which the user equipment determines whether the condition for transmission of the scheduled data on the unlicensed spectrum is met is specifically:

the user equipment is configured to determine whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

With reference to the fourth aspect of the embodiments of the present invention, in a fifth possible implementation manner of the fourth aspect of the embodiments of the present invention, in terms of a radio bearer, the scheduled data includes signaling radio bearer data and data radio bearer data, and the signaling radio bearer data includes a measurement report of the user equipment; and a manner in which the user equipment determines whether the condition for transmission of the scheduled data on the unlicensed spectrum is met is specifically:

the user equipment is configured to determine whether the scheduled data is the measurement report of the user equipment, where if the scheduled data is not the measurement report of the user equipment, the condition for transmission of the scheduled data on the unlicensed spectrum is met.

With reference to any one of the fourth aspect of the embodiments of the present invention, or the first to the fifth possible implementation manners of the fourth aspect of the embodiments of the present invention, in a sixth possible implementation manner of the fourth aspect of the embodiments of the present invention, if the condition for transmission of the scheduled data on the unlicensed spectrum is not met, and the data scheduling request is sent to the user equipment by the base station by using the unlicensed spectrum, the user equipment is further configured to send indication information to the base station by using the unlicensed spectrum resource, where the indication information is used to indicate that the scheduled data is sent to the base station without using the unlicensed spectrum, or is used to indicate information about a reason for sending the scheduled data without using the unlicensed spectrum; and the base station is further configured to receive the indication information sent by the user equipment by using the unlicensed spectrum resource.

In the embodiments of the present invention, after receiving a data scheduling request sent by a base station, user equipment determines whether a condition for transmission of scheduled data on an unlicensed spectrum is met, and if the condition for transmission of the scheduled data on the unlicensed spectrum is met, sends the scheduled data to the base station by using an unlicensed spectrum resource allocated to the scheduled data by the base station. In the embodiments of the present invention, the user equipment transmits, to the base station by using the unlicensed spectrum resource, data that can be transmitted on the unlicensed spectrum, and avoids transmitting, to the base station by using the unlicensed spectrum resource, data that can be transmitted on a licensed spectrum, thereby improving data transmission reliability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention disclose a data transmission method, apparatus, and system, to improve data transmission reliability. Details are separately illustrated in the following.

Figure 1:
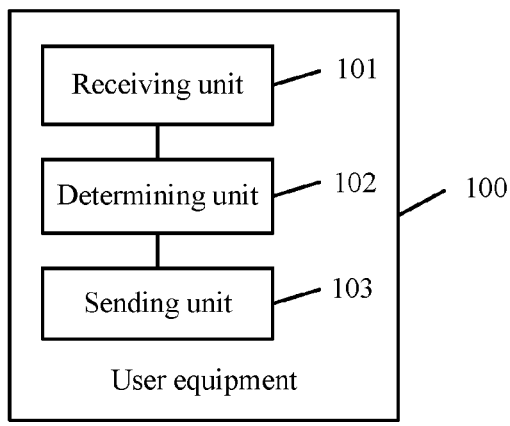
FIG. 1 is a structural diagram of user equipment according to an embodiment of the present invention.

Referring to FIG. 1, FIG. 1 is a structural diagram of user equipment 100 according to an embodiment of the present invention. The user equipment 100 shown in FIG. 1 may be a smartphone, a tablet computer, or the like, which is not limited in this embodiment of the present invention. As shown in FIG. 1, the user equipment 100 may include:

a receiving unit 101, configured to receive a data scheduling request sent by a base station, where the data scheduling request includes resource information allocated to scheduled data by the base station, and the resource information includes an unlicensed spectrum resource;

a determining unit 102, configured to determine whether a condition for transmission of the scheduled data on an unlicensed spectrum is met, where the scheduled data is scheduled according to the data scheduling request received by the receiving unit 101; and a sending unit 103, configured to: when a determining result of the determining unit 102 is that the condition for transmission of the scheduled data on the unlicensed spectrum is met, send the scheduled data to the base station by using the unlicensed spectrum resource.

In this embodiment, when the base station needs to schedule data from the user equipment, the receiving unit 101 receives the data scheduling request sent by the base station. The data scheduling request includes the resource information allocated to the scheduled data by the base station, and the resource information includes the unlicensed spectrum resource. In addition, the resource information further includes a licensed spectrum resource, so that the sending unit 103 sends the scheduled data to the base station by using the licensed spectrum resource or the unlicensed spectrum resource.

In this embodiment, after the receiving unit 101 receives the data scheduling request sent by the base station, the determining unit 102 determines whether the condition for transmission of the scheduled data on the unlicensed spectrum is met. A basis for determining whether the condition for transmission of the scheduled data on the unlicensed spectrum is met may be a rule preset by the base station, or may be a pre-agreement between the base station and the user equipment, which is not limited in this embodiment. When the determining result of the determining unit 102 is that the condition for transmission of the scheduled data on the unlicensed spectrum is met, the sending unit 103 sends the scheduled data to the base station by using the unlicensed spectrum resource.

In a possible implementation manner, the determining unit 102 may include:

a first obtaining subunit, configured to obtain a priority level of the scheduled data, where the scheduled data is scheduled according to the data scheduling request received by the receiving unit 101; and a first determining subunit, configured to determine whether the priority level obtained by the first obtaining subunit is less than a preset level threshold, where if the priority level is less than the preset level threshold, the condition for transmission of the scheduled data on the unlicensed spectrum is met.

Specifically, the first determining subunit is configured to determine whether the priority level obtained by the first obtaining subunit is less than the preset level threshold, and if the priority level is less than the preset level threshold, the sending unit 103 is triggered to send the scheduled data to the base station by using the unlicensed spectrum resource.

In this embodiment, to ensure data transmission reliability, important data needs to be sent to the base station by the user equipment by using the licensed spectrum resource, and unimportant data can be sent to the base station by the user equipment by using the unlicensed spectrum resource. Because different data has different priority levels in communication, and more important data has a higher priority level, when the priority level of the scheduled data is less than the preset level threshold, the scheduled data is determined as unimportant data; and when the priority level of the scheduled data is greater than or equal to the preset level threshold, the scheduled data is determined as important data. The preset level threshold may be preset by the base station, or may be pre-agreed between the user equipment and the base station, and the preset level threshold is specifically set according to a requirement, which is not limited in this embodiment. Therefore, after the receiving unit 101 receives the data scheduling request sent by the base station, the first obtaining subunit obtains the priority level of the scheduled data, and then the first determining subunit determines whether the scheduled data priority level obtained by the first obtaining subunit is less than the preset level threshold. When a determining result of the first determining subunit is that the priority level of the scheduled data is less than the preset level threshold, the sending unit 103 sends the scheduled data to the base station by using the unlicensed spectrum resource.

In a possible implementation manner, the determining unit 102 may include:

a second obtaining subunit, configured to obtain a transmission delay of a radio bearer channel carrying the scheduled data, where the scheduled data is scheduled according to the data scheduling request received by the receiving unit 101; and a second determining subunit, configured to determine whether the transmission delay obtained by the second obtaining subunit is greater than or equal to a preset maximum delay, where if the transmission delay is greater than or equal to the preset maximum delay, the condition for transmission of the scheduled data on the unlicensed spectrum is met.

Specifically, the second determining subunit is configured to determine whether the transmission delay obtained by the second obtaining subunit is greater than or equal to the preset maximum delay, and if the transmission delay is greater than or equal to the preset maximum delay, the sending unit 103 is triggered to send the scheduled data to the base station by using the unlicensed spectrum resource.

In this embodiment, a radio bearer (RB) is a channel that connects the base station and the user equipment. Any data sent from the user equipment to the base station needs to pass the RB. The RB includes a signaling radio bearer (SRB) and a data radio bearer (DRB). The SRB is an actual channel on which a signaling message is transmitted, and the DRB is an actual channel on which user data is transmitted. According to whether the scheduled data is the signaling message or the user data, the base station allocates the RB channel to the scheduled data when scheduling the scheduled data. To ensure data transmission reliability, important data needs to be sent to the base station by the user equipment by using the licensed spectrum resource, and unimportant data can be sent to the base station by the user equipment by using the unlicensed spectrum resource. Because a transmission delay of each RB channel is different, and more important data requires a smaller transmission delay, when the transmission delay of the scheduled data is greater than or equal to the preset maximum delay, the scheduled data is determined as unimportant data; and when the transmission delay of the scheduled data is less than the preset maximum delay, the scheduled data is determined as important data. The preset maximum delay may be preset by the base station, or may be pre-agreed between the user equipment and the base station, and the preset maximum delay may be specifically set according to a requirement, which is not limited in this embodiment. Therefore, after the receiving unit 101 receives the data scheduling request sent by the base station, the second obtaining subunit obtains the transmission delay of the radio bearer channel carrying the scheduled data, and then the second determining subunit determines whether the scheduled data transmission delay obtained by the second obtaining subunit is greater than or equal to the preset maximum delay. When a determining result of the second determining subunit is that the transmission delay of the scheduled data is greater than or equal to the preset maximum delay, the sending unit 103 sends the scheduled data to the base station by using the unlicensed spectrum resource.

In a possible implementation manner, the determining unit 102 may include:

a third obtaining subunit, configured to obtain a maximum bit rate at which the scheduled data is transmitted on a radio bearer channel carrying the scheduled data, where the scheduled data is scheduled according to the data scheduling request received by the receiving unit 101; and a third determining subunit, configured to determine whether the maximum bit rate obtained by the third obtaining subunit is less than a preset maximum bit rate, where if the maximum bit rate is less than the preset maximum bit rate, the condition for transmission of the scheduled data on the unlicensed spectrum is met.

Specifically, the third determining subunit is configured to determine whether the maximum bit rate that is obtained by the third obtaining subunit and at which the scheduled data is transmitted on the radio bearer channel carrying the scheduled data is less than the preset maximum bit rate, and if the maximum bit rate is less than the preset maximum bit rate, the sending unit 103 is triggered to send the scheduled data to the base station by using the unlicensed spectrum resource.

In this embodiment, an RB is a channel that connects the base station and the user equipment. Any data sent from the user equipment to the base station needs to pass the RB. The RB includes an SRB and a DRB. The SRB is an actual channel on which a signaling message is transmitted, and the DRB is an actual channel on which user data is transmitted. According to whether the scheduled data is the signaling message or the user data, the base station allocates the RB channel to the scheduled data when scheduling the scheduled data. To ensure data transmission reliability, important data needs to be sent to the base station by the user equipment by using the licensed spectrum resource, and unimportant data can be sent to the base station by the user equipment by using the unlicensed spectrum resource. Because a maximum bit rate at which data is transmitted on each RB channel is different, and more important data requires a larger maximum bit rate, when the maximum bit rate at which the scheduled data is transmitted is less than the preset maximum bit rate, the scheduled data is determined as unimportant data; and when the maximum bit rate at which the scheduled data is transmitted is greater than or equal to the preset maximum bit rate, the scheduled data is determined as important data. The preset maximum bit rate may be preset by the base station, or may be pre-agreed between the user equipment and the base station, and the preset maximum bit rate may be specifically set according to a requirement, which is not limited in this embodiment. Therefore, after the receiving unit 101 receives the data scheduling request sent by the base station, the third obtaining subunit obtains the maximum bit rate at which the scheduled data is transmitted on the radio bearer channel carrying the scheduled data, and then the third determining subunit determines whether the maximum bit rate that is obtained by the third obtaining subunit and at which the scheduled data is transmitted on the radio bearer channel carrying the scheduled data is less than the preset maximum bit rate. When a determining result of the third determining subunit is that the maximum bit rate at which the scheduled data is transmitted on the radio bearer channel carrying the scheduled data is less than the preset maximum bit rate, the sending unit 103 sends the scheduled data to the base station by using the unlicensed spectrum resource.

In a possible implementation manner, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report.

The determining unit 102 is specifically configured to determine whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

In this embodiment, the scheduled data includes the control data and the user data at the Medium Access Control (MAC) sublayer, the radio link control (RLC) sublayer, or the Packet Data Convergence Protocol (PDCP) sublayer, and the control data includes the MAC control element (CE), the RLC status report, and the PDCP status report. Because data about the MAC CE, about the RLC status report, or about the PDCP status report is highly important, when the scheduled data is the at least one of the MAC CE, the RLC status report, or the PDCP status report, the sending unit 103 sends the scheduled data to the base station by using the licensed spectrum resource; and when the scheduled data is data except the at least one of the MAC CE, the RLC status report, or the PDCP status report, the sending unit 103 sends the scheduled data to the base station by using the unlicensed spectrum resource.

In a possible implementation manner, in terms of a radio bearer, the scheduled data includes signaling radio bearer data and data radio bearer data, and the signaling radio bearer data includes a measurement report of the user equipment.

The determining unit 102 is specifically configured to determine whether the scheduled data is the measurement report of the user equipment, where if the scheduled data is not the measurement report of the user equipment, the condition for transmission of the scheduled data on the unlicensed spectrum is met.

In this embodiment, in terms of an RB, the scheduled data includes the SRB data and the DRB data, and the SRB data includes the measurement report of the user equipment. Because the measurement report of the user equipment plays a crucial role in a user communication process, when the scheduled data is the measurement report of the user equipment, the sending unit 103 sends the scheduled data to the base station by using the licensed spectrum resource; and when the scheduled data is data except the measurement report of the user equipment, the sending unit 103 sends the scheduled data to the base station by using the unlicensed spectrum resource.

In a possible implementation manner, the sending unit 103 is further configured to: when the determining result of the determining unit 102 is that the condition for transmission of the scheduled data on the unlicensed spectrum is not met, and the data scheduling request is sent to the user equipment by the base station by using the unlicensed spectrum, send indication information to the base station by using the unlicensed spectrum resource, where the indication information is used to indicate that the scheduled data is sent to the base station without using the unlicensed spectrum, or is used to indicate information about a reason for sending the scheduled data without using the unlicensed spectrum.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource. Therefore, when a determining result of the determining unit 102 is that a condition for transmission of the scheduled data on the licensed spectrum is met, the determining unit 102 continues to determine whether the data scheduling request is sent to the user equipment by the base station by using the unlicensed spectrum. When the determining result of the determining unit 102 is that the data scheduling request is sent to the user equipment by the base station by using the unlicensed spectrum, the sending unit 103 sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. When the determining result of the determining unit 102 is that the data scheduling request is sent to the user equipment by the base station by using the licensed spectrum, the sending unit 103 sends the scheduled data to the base station by using the licensed spectrum resource.

According to the user equipment described in FIG. 1, the user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 2:
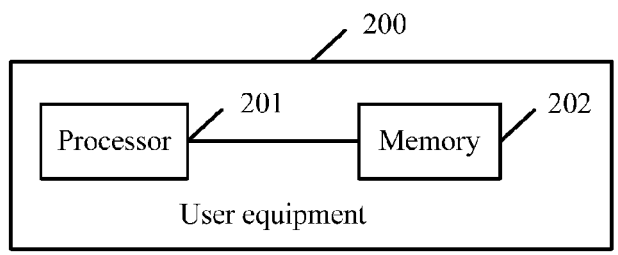
FIG. 2 is another structural diagram of user equipment according to an embodiment of the present invention.

Referring to FIG. 2, FIG. 2 is another structural diagram of user equipment 200 according to an embodiment of the present invention. The user equipment 200 shown in FIG. 2 may be a smartphone, a tablet computer, or the like, which is not limited in this embodiment of the present invention. As shown in FIG. 2, the user equipment 200 may include a processor 201 and a memory 202, where the memory 202 stores a set of program code, and the processor 201 is configured to invoke the program code stored in the memory 202 to perform the following operations:

receiving a data scheduling request sent by a base station, where the data scheduling request includes resource information allocated to scheduled data by the base station, and the resource information includes an unlicensed spectrum resource;

determining whether a condition for transmission of the scheduled data on an unlicensed spectrum is met; and if the condition for transmission of the scheduled data on the unlicensed spectrum is met, sending the scheduled data to the base station by using the unlicensed spectrum resource.

In a possible implementation manner, a manner of the determining, by the processor 201, whether a condition for transmission of the scheduled data on an unlicensed spectrum is met is specifically:

obtaining a priority level of the scheduled data; and determining whether the priority level is less than a preset level threshold, where if the priority level is less than the preset level threshold, the condition for transmission of the scheduled data on the unlicensed spectrum is met.

In a possible implementation manner, a manner of the determining, by the processor 201, whether a condition for transmission of the scheduled data on an unlicensed spectrum is met is specifically:

obtaining a transmission delay of a radio bearer channel carrying the scheduled data; and determining whether the transmission delay is greater than or equal to a preset maximum delay, where if the transmission delay is greater than or equal to the preset maximum delay, the condition for transmission of the scheduled data on the unlicensed spectrum is met.

In a possible implementation manner, a manner of the determining, by the processor 201, whether a condition for transmission of the scheduled data on an unlicensed spectrum is met is specifically:

obtaining a maximum bit rate at which the scheduled data is transmitted on a radio bearer channel carrying the scheduled data; and determining whether the maximum bit rate is less than a preset maximum bit rate, where if the maximum bit rate is less than the preset maximum bit rate, the condition for transmission of the scheduled data on the unlicensed spectrum is met.

In a possible implementation manner, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report.

A manner of the determining, by the processor 201, whether a condition for transmission of the scheduled data on an unlicensed spectrum is met is specifically:

determining whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

In a possible implementation manner, in terms of a radio bearer, the scheduled data includes signaling radio bearer data and data radio bearer data, and the signaling radio bearer data includes a measurement report of the user equipment.

A manner of the determining, by the processor 201, whether a condition for transmission of the scheduled data on an unlicensed spectrum is met is specifically:

determining whether the scheduled data is the measurement report of the user equipment, where if the scheduled data is not the measurement report of the user equipment, the condition for transmission of the scheduled data on the unlicensed spectrum is met.

In a possible implementation manner, the processor 201 further performs the following operations:

if the condition for transmission of the scheduled data on the unlicensed spectrum is not met, and the data scheduling request is sent to the user equipment by the base station by using the unlicensed spectrum, sending indication information to the base station by using the unlicensed spectrum resource, where the indication information is used to indicate that the scheduled data is sent to the base station without using the unlicensed spectrum, or is used to indicate information about a reason for sending the scheduled data without using the unlicensed spectrum.

According to the user equipment described in FIG. 2, the user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 3:
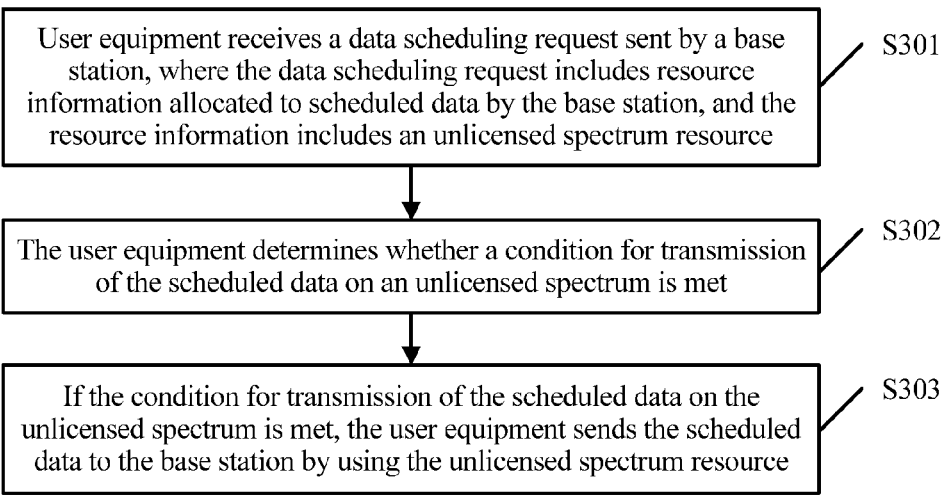
FIG. 3 is a flowchart of a data transmission method according to an embodiment of the present invention.

Referring to FIG. 3, FIG. 3 is a flowchart of a data transmission method according to an embodiment of the present invention. The data transmission method shown in FIG. 3 is applicable to user equipment such as a smartphone or a tablet computer, which is not limited in this embodiment of the present invention. As shown in FIG. 3, the data transmission method may include the following steps:

S301. The user equipment receives a data scheduling request sent by a base station, where the data scheduling request includes resource information allocated to scheduled data by the base station, and the resource information includes an unlicensed spectrum resource.

In this embodiment, when the base station needs to schedule data from the user equipment, the user equipment receives the data scheduling request sent by the base station. The data scheduling request includes the resource information allocated to the scheduled data by the base station, and the resource information includes the unlicensed spectrum resource. In addition, the resource information further includes a licensed spectrum resource, so that the user equipment sends the scheduled data to the base station by using the licensed spectrum resource or the unlicensed spectrum resource.

S302. The user equipment determines whether a condition for transmission of the scheduled data on an unlicensed spectrum is met.

In this embodiment, after receiving the data scheduling request sent by the base station, the user equipment determines whether the condition for transmission of the scheduled data on the unlicensed spectrum is met. A basis for determining whether the condition for transmission of the scheduled data on the unlicensed spectrum is met may be a rule preset by the base station, or may be a pre-agreement between the base station and the user equipment, which is not limited in this embodiment.

S303. If the condition for transmission of the scheduled data on the unlicensed spectrum is met, the user equipment sends the scheduled data to the base station by using the unlicensed spectrum resource.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource.

Correspondingly, if the condition for transmission of the scheduled data on the unlicensed spectrum is not met, that is, a condition for transmission of the scheduled data on the licensed spectrum is met, the user equipment continues to determine whether the data scheduling request is sent to the user equipment by the base station by using the unlicensed spectrum. When the data scheduling request is sent to the user equipment by the base station by using the unlicensed spectrum, the user equipment sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. When the data scheduling request is sent to the user equipment by the base station by using the licensed spectrum, the user equipment sends the scheduled data to the base station by using the licensed spectrum resource.

According to the data transmission method described in FIG. 3, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 4:
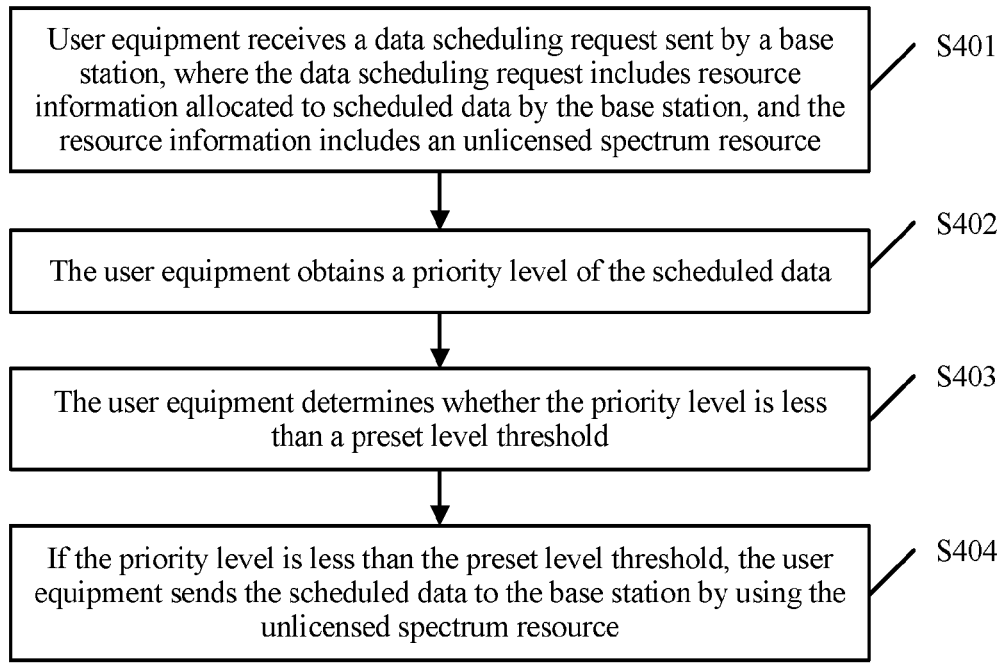
FIG. 4 is a flowchart of another data transmission method according to an embodiment of the present invention.

Referring to FIG. 4, FIG. 4 is a flowchart of another data transmission method according to an embodiment of the present invention. The data transmission method shown in FIG. 4 is applicable to user equipment such as a smartphone or a tablet computer, which is not limited in this embodiment of the present invention. As shown in FIG. 4, the data transmission method may include the following steps:

S401. The user equipment receives a data scheduling request sent by a base station, where the data scheduling request includes resource information allocated to scheduled data by the base station, and the resource information includes an unlicensed spectrum resource.

In this embodiment, when the base station needs to schedule data from the user equipment, the user equipment receives the data scheduling request sent by the base station. The data scheduling request includes the resource information allocated to the scheduled data by the base station, and the resource information includes the unlicensed spectrum resource. In addition, the resource information further includes a licensed spectrum resource, so that the user equipment sends the scheduled data to the base station by using the licensed spectrum resource or the unlicensed spectrum resource.

S402. The user equipment obtains a priority level of the scheduled data.

In this embodiment, to ensure data transmission reliability, important data needs to be sent to the base station by the user equipment by using the licensed spectrum resource, and unimportant data can be sent to the base station by the user equipment by using the unlicensed spectrum resource. Because different data has different priority levels in communication, and more important data has a higher priority level, when the priority level of the scheduled data is less than a preset level threshold, the scheduled data is determined as unimportant data; and when the priority level of the scheduled data is greater than or equal to the preset level threshold, the scheduled data is determined as important data. The preset level threshold may be preset by the base station, or may be pre-agreed between the user equipment and the base station, and the preset level threshold is specifically set according to a requirement, which is not limited in this embodiment. Therefore, after receiving the data scheduling request sent by the base station, the user equipment first obtains the priority level of the scheduled data.

S403. The user equipment determines whether the priority level is less than a preset level threshold.

S404. If the priority level is less than the preset level threshold, the user equipment sends the scheduled data to the base station by using the unlicensed spectrum resource.

In a possible implementation manner, if a condition for transmission of the scheduled data on an unlicensed spectrum is not met, and the data scheduling request is sent to the user equipment by the base station by using the unlicensed spectrum, the user equipment sends indication information to the base station by using the unlicensed spectrum resource. The indication information is used to indicate that the scheduled data is sent to the base station without using the unlicensed spectrum, or is used to indicate information about a reason for sending the scheduled data without using the unlicensed spectrum.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource. Therefore, when the priority level of the scheduled data is greater than or equal to the preset level threshold, that is, a condition for transmission of the scheduled data on the licensed spectrum is met, the user equipment continues to determine whether the data scheduling request is sent to the user equipment by the base station by using the unlicensed spectrum. If the data scheduling request is sent to the user equipment by the base station by using the unlicensed spectrum, the user equipment sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. If the data scheduling request is sent to the user equipment by the base station by using the licensed spectrum, the user equipment sends the scheduled data to the base station by using the licensed spectrum resource.

According to the data transmission method described in FIG. 4, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 5:
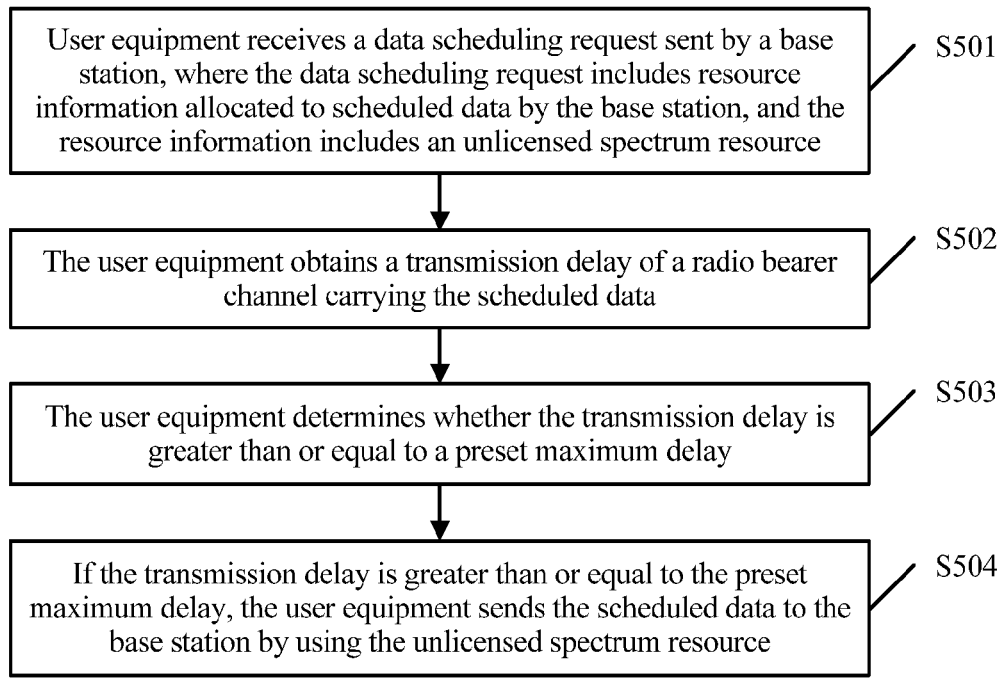
FIG. 5 is a flowchart of still another data transmission method according to an embodiment of the present invention.

Referring to FIG. 5, FIG. 5 is a flowchart of still another data transmission method according to an embodiment of the present invention. The data transmission method shown in FIG. 5 is applicable to user equipment such as a smartphone or a tablet computer, which is not limited in this embodiment of the present invention. As shown in FIG. 5, the data transmission method may include the following steps:

S501. The user equipment receives a data scheduling request sent by a base station, where the data scheduling request includes resource information allocated to scheduled data by the base station, and the resource information includes an unlicensed spectrum resource.

In this embodiment, when the base station needs to schedule data from the user equipment, the user equipment receives the data scheduling request sent by the base station. The data scheduling request includes the resource information allocated to the scheduled data by the base station, and the resource information includes the unlicensed spectrum resource. In addition, the resource information further includes a licensed spectrum resource, so that the user equipment sends the scheduled data to the base station by using the licensed spectrum resource or the unlicensed spectrum resource.

S502. The user equipment obtains a transmission delay of a radio bearer channel carrying the scheduled data.

In this embodiment, an RB is a channel that connects the base station and the user equipment. Any data sent from the user equipment to the base station needs to pass the RB. The RB includes an SRB and a DRB. The SRB is an actual channel on which a signaling message is transmitted, and the DRB is an actual channel on which user data is transmitted. According to whether the scheduled data is the signaling message or the user data, the base station allocates the RB channel to the scheduled data when scheduling the scheduled data. To ensure data transmission reliability, important data needs to be sent to the base station by the user equipment by using the licensed spectrum resource, and unimportant data can be sent to the base station by the user equipment by using the unlicensed spectrum resource. Because a transmission delay of each RB channel is different, and more important data requires a smaller transmission delay, when the transmission delay of the scheduled data is greater than or equal to the preset maximum delay, the scheduled data is determined as unimportant data; and when the transmission delay of the scheduled data is less than the preset maximum delay, the scheduled data is determined as important data. The preset maximum delay may be preset by the base station, or may be pre-agreed between the user equipment and the base station, and the preset maximum delay may be specifically set according to a requirement, which is not limited in this embodiment. Therefore, after the user equipment receives the data scheduling request sent by the base station, the user equipment obtains the transmission delay of the radio bearer channel carrying the scheduled data.

S503. The user equipment determines whether the transmission delay is greater than or equal to a preset maximum delay.

S504. If the transmission delay is greater than or equal to the preset maximum delay, the user equipment sends the scheduled data to the base station by using the unlicensed spectrum resource.

In a possible implementation manner, if a condition for transmission of the scheduled data on an unlicensed spectrum is not met, and the data scheduling request is sent to the user equipment by the base station by using the unlicensed spectrum, the user equipment sends indication information to the base station by using the unlicensed spectrum resource. The indication information is used to indicate that the scheduled data is sent to the base station without using the unlicensed spectrum, or is used to indicate information about a reason for sending the scheduled data without using the unlicensed spectrum.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource. Therefore, if a priority level of the scheduled data is greater than or equal to a preset level threshold, that is, a condition for transmission of the scheduled data on the licensed spectrum is met, the user equipment continues to determine whether the data scheduling request is sent to the user equipment by the base station by using the unlicensed spectrum. If the data scheduling request is sent to the user equipment by the base station by using the unlicensed spectrum, the user equipment sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. If the data scheduling request is sent to the user equipment by the base station by using the licensed spectrum, the user equipment sends the scheduled data to the base station by using the licensed spectrum resource.

According to the data transmission method described in FIG. 5, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum to the base station, thereby improving data transmission reliability.

Figure 6:
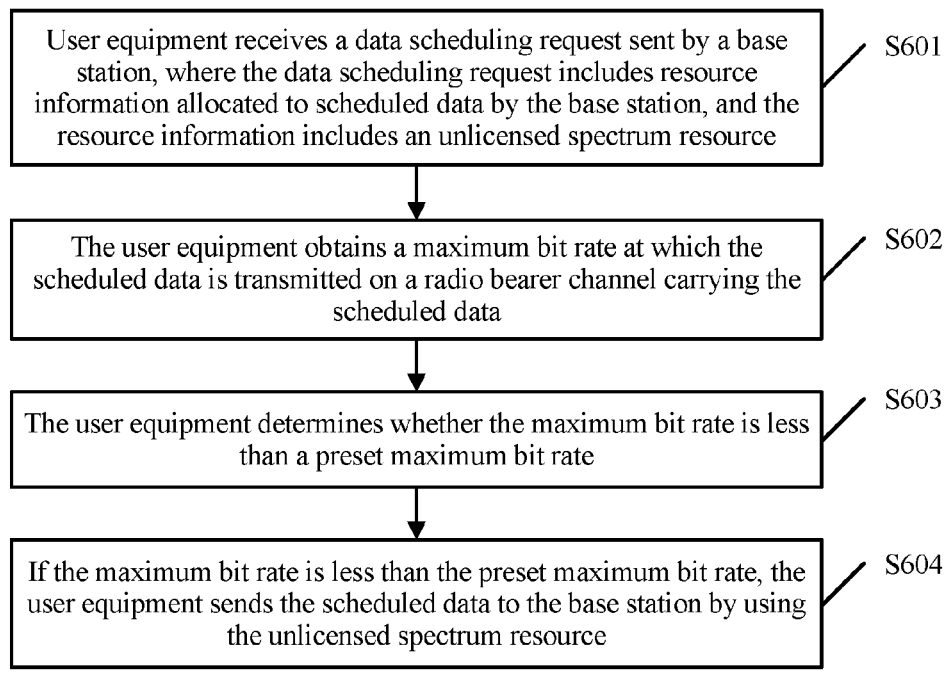
FIG. 6 is a flowchart of yet another data transmission method according to an embodiment of the present invention.

Referring to FIG. 6, FIG. 6 is a flowchart of yet another data transmission method according to an embodiment of the present invention. The data transmission method shown in FIG. 6 is applicable to user equipment such as a smartphone or a tablet computer, which is not limited in this embodiment of the present invention. As shown in FIG. 6, the data transmission method may include the following steps:

S601. The user equipment receives a data scheduling request sent by a base station, where the data scheduling request includes resource information allocated to scheduled data by the base station, and the resource information includes an unlicensed spectrum resource.

In this embodiment, when the base station needs to schedule data from the user equipment, the user equipment receives the data scheduling request sent by the base station. The data scheduling request includes the resource information allocated to the scheduled data by the base station, and the resource information includes the unlicensed spectrum resource. In addition, the resource information further includes a licensed spectrum resource, so that the user equipment sends the scheduled data to the base station by using the licensed spectrum resource or the unlicensed spectrum resource.

S602. The user equipment obtains a maximum bit rate at which the scheduled data is transmitted on a radio bearer channel carrying the scheduled data.

In this embodiment, an RB is a channel that connects the base station and the user equipment. Any data sent from the user equipment to the base station needs to pass the RB. The RB includes an SRB and a DRB. The SRB is an actual channel on which a signaling message is transmitted, and the DRB is an actual channel on which user data is transmitted. According to whether the scheduled data is the signaling message or the user data, the base station allocates the RB channel to the scheduled data when scheduling the scheduled data. To ensure data transmission reliability, important data needs to be sent to the base station by the user equipment by using the licensed spectrum resource, and unimportant data can be sent to the base station by the user equipment by using the unlicensed spectrum resource. Because a maximum bit rate at which data is transmitted on each RB channel is different, and more important data requires a larger maximum bit rate, when the maximum bit rate at which the scheduled data is transmitted is less than the preset maximum bit rate, the scheduled data is determined as unimportant data; and when the maximum bit rate at which the scheduled data is transmitted is greater than or equal to the preset maximum bit rate, the scheduled data is determined as important data. The preset maximum bit rate may be preset by the base station, or may be pre-agreed between the user equipment and the base station, and the preset maximum bit rate may be specifically set according to a requirement, which is not limited in this embodiment. Therefore, after the user equipment receives the data scheduling request sent by the base station, the user equipment obtains the maximum bit rate at which the scheduled data is transmitted on the radio bearer channel carrying the scheduled data.

S603. The user equipment determines whether the maximum bit rate is less than a preset maximum bit rate.

S604. If the maximum bit rate is less than the preset maximum bit rate, the user equipment sends the scheduled data to the base station by using the unlicensed spectrum resource.

In a possible implementation manner, if a condition for transmission of the scheduled data on an unlicensed spectrum is not met, and the data scheduling request is sent to the user equipment by the base station by using the unlicensed spectrum, the user equipment sends indication information to the base station by using the unlicensed spectrum resource. The indication information is used to indicate that the scheduled data is sent to the base station without using the unlicensed spectrum, or is used to indicate information about a reason for sending the scheduled data without using the unlicensed spectrum.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource. Therefore, when a priority level of the scheduled data is greater than or equal to a preset level threshold, that is, a condition for transmission of the scheduled data on the licensed spectrum is met, the user equipment continues to determine whether the data scheduling request is sent to the user equipment by the base station by using the unlicensed spectrum. If the data scheduling request is sent to the user equipment by the base station by using the unlicensed spectrum, the user equipment sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. If the data scheduling request is sent to the user equipment by the base station by using the licensed spectrum, the user equipment sends the scheduled data to the base station by using the licensed spectrum resource.

According to the data transmission method described in FIG. 6, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 7:
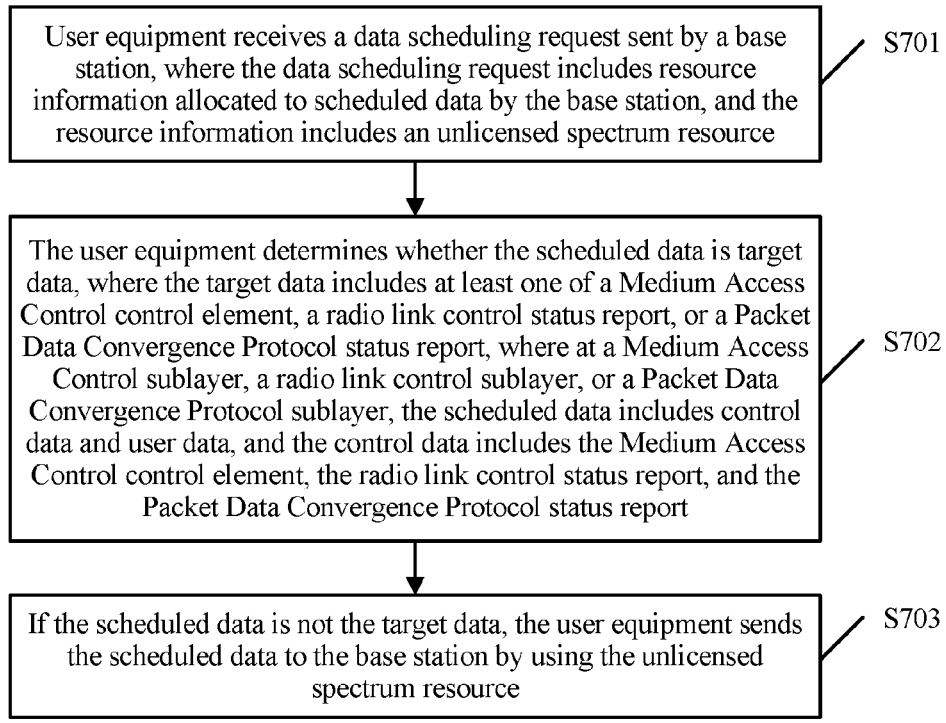
FIG. 7 is a flowchart of still yet another data transmission method according to an embodiment of the present invention.

Referring to FIG. 7, FIG. 7 is a flowchart of still yet another data transmission method according to an embodiment of the present invention. The data transmission method shown in FIG. 7 is applicable to user equipment such as a smartphone or a tablet computer, which is not limited in this embodiment of the present invention. As shown in FIG. 7, the data transmission method may include the following steps:

S701. The user equipment receives a data scheduling request sent by a base station, where the data scheduling request includes resource information allocated to scheduled data by the base station, and the resource information includes an unlicensed spectrum resource.

In this embodiment, when the base station needs to schedule data from the user equipment, the user equipment receives the data scheduling request sent by the base station. The data scheduling request includes the resource information allocated to the scheduled data by the base station, and the resource information includes the unlicensed spectrum resource. In addition, the resource information further includes a licensed spectrum resource, so that the user equipment sends the scheduled data to the base station by using the licensed spectrum resource or the unlicensed spectrum resource.

S702. The user equipment determines whether the scheduled data is target data, where the target data includes at least one of a Medium Access Control control element, a radio link control status report, or a Packet Data Convergence Protocol status report, where at a Medium Access Control sublayer, a radio link control sublayer, or a Packet Data Convergence Protocol sublayer, the scheduled data includes control data and user data, and the control data includes the Medium Access Control control element, the radio link control status report, and the Packet Data Convergence Protocol status report.

S703. If the scheduled data is not the target data, the user equipment sends the scheduled data to the base station by using the unlicensed spectrum resource.

In this embodiment, at the MAC sublayer, the RLC sublayer, or the PDCP sublayer, the scheduled data includes the control data and the user data, and the control data includes the MAC CE, the RLC status report, and the PDCP status report. Because data about the MAC CE, about the RLC status report, or about the PDCP status report is highly important, when the scheduled data is the at least one of the MAC CE, the RLC status report, or the PDCP status report, the user equipment sends the scheduled data to the base station by using the licensed spectrum resource. When the scheduled data is data except the at least one of the MAC CE, the RLC status report, or the PDCP status report, the user equipment sends the scheduled data to the base station by using the unlicensed spectrum resource.

In a possible implementation manner, if a condition for transmission of the scheduled data on an unlicensed spectrum is not met, and the data scheduling request is sent to the user equipment by the base station by using the unlicensed spectrum, the user equipment sends indication information to the base station by using the unlicensed spectrum resource. The indication information is used to indicate that the scheduled data is sent to the base station without using the unlicensed spectrum, or is used to indicate information about a reason for sending the scheduled data without using the unlicensed spectrum.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource. Therefore, if a priority level of the scheduled data is greater than or equal to a preset level threshold, that is, a condition for transmission of the scheduled data on the licensed spectrum is met, the user equipment continues to determine whether the data scheduling request is sent to the user equipment by the base station by using the unlicensed spectrum. If the data scheduling request is sent to the user equipment by the base station by using the unlicensed spectrum, the user equipment sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. If the data scheduling request is sent to the user equipment by the base station by using the licensed spectrum, the user equipment sends the scheduled data to the base station by using the licensed spectrum resource.

According to the data transmission method described in FIG. 7, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 8:
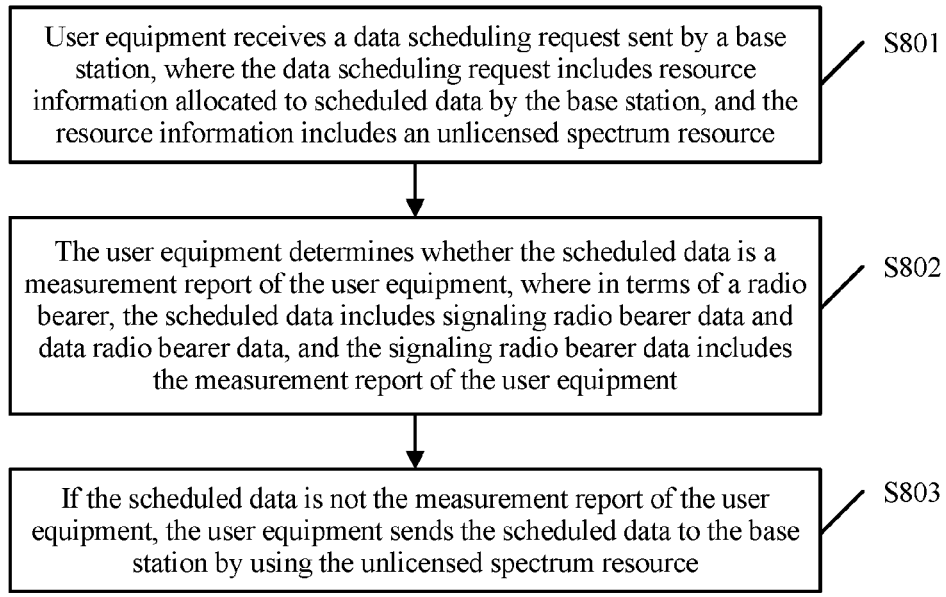
FIG. 8 is a flowchart of even yet another data transmission method according to an embodiment of the present invention.

Referring to FIG. 8, FIG. 8 is a flowchart of even yet another data transmission method according to an embodiment of the present invention. The data transmission method shown in FIG. 8 is applicable to user equipment such as a smartphone or a tablet computer, which is not limited in this embodiment of the present invention. As shown in FIG. 8, the data transmission method may include the following steps:

S801. The user equipment receives a data scheduling request sent by a base station, where the data scheduling request includes resource information allocated to scheduled data by the base station, and the resource information includes an unlicensed spectrum resource.

In this embodiment, when the base station needs to schedule data from the user equipment, the user equipment receives the data scheduling request sent by the base station. The data scheduling request includes the resource information allocated to the scheduled data by the base station, and the resource information includes the unlicensed spectrum resource. In addition, the resource information further includes a licensed spectrum resource, so that the user equipment sends the scheduled data to the base station by using the licensed spectrum resource or the unlicensed spectrum resource.

S802. The user equipment determines whether the scheduled data is a measurement report of the user equipment, where in terms of a radio bearer, the scheduled data includes signaling radio bearer data and data radio bearer data, and the signaling radio bearer data includes the measurement report of the user equipment.

S803. If the scheduled data is not the measurement report of the user equipment, the user equipment sends the scheduled data to the base station by using the unlicensed spectrum resource.

In this embodiment, in terms of an RB, the scheduled data includes the SRB data and the DRB data, and the SRB data includes the measurement report of the user equipment. Because the measurement report of the user equipment plays a crucial role in a user communication process, when the scheduled data is the measurement report of the user equipment, the user equipment sends the scheduled data to the base station by using the licensed spectrum resource. When the scheduled data is data except the measurement report of the user equipment, the user equipment sends the scheduled data to the base station by using the unlicensed spectrum resource.

In a possible implementation manner, if a condition for transmission of the scheduled data on an unlicensed spectrum is not met, and the data scheduling request is sent to the user equipment by the base station by using the unlicensed spectrum, the user equipment sends indication information to the base station by using the unlicensed spectrum resource. The indication information is used to indicate that the scheduled data is sent to the base station without using the unlicensed spectrum, or is used to indicate information about a reason for sending the scheduled data without using the unlicensed spectrum.

In this embodiment, when the data scheduling request is sent to the user equipment by the base station by using a licensed spectrum, the scheduled data may be sent to the base station by the user equipment by using the licensed spectrum resource, or may be sent to the base station by the user equipment by using the unlicensed spectrum resource. When the data scheduling request is sent to the user equipment by the base station by using the unlicensed spectrum, the scheduled data can be sent to the base station by the user equipment only by using the unlicensed spectrum resource. Therefore, if a priority level of the scheduled data is greater than or equal to a preset level threshold, that is, a condition for transmission of the scheduled data on the licensed spectrum is met, the user equipment continues to determine whether the data scheduling request is sent to the user equipment by the base station by using the unlicensed spectrum. If the data scheduling request is sent to the user equipment by the base station by using the unlicensed spectrum, the user equipment sends the indication information to the base station by using the unlicensed spectrum resource. The indication information is used to indicate that the scheduled data is sent to the base station without using the unlicensed spectrum, or is used to indicate the information about the reason for sending the scheduled data without using the unlicensed spectrum. If the data scheduling request is sent to the user equipment by the base station by using the licensed spectrum, the user equipment sends the scheduled data to the base station by using the licensed spectrum resource.

According to the data transmission method described in FIG. 8, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

Figure 9:
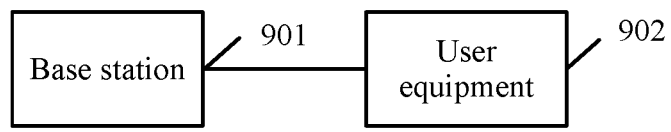
FIG. 9 is a structural diagram of a data transmission system according to an embodiment of the present invention.

Referring to FIG. 9, FIG. 9 is a structural diagram of a data transmission system according to an embodiment of the present invention. As shown in FIG. 9, the data transmission system may include a base station 901 and user equipment 902.

The base station 901 is configured to send a data scheduling request to the user equipment 902, where the data scheduling request includes resource information allocated to scheduled data by the base station 901, and the resource information includes an unlicensed spectrum resource.

The user equipment 902 is configured to: receive the data scheduling request sent by the base station 901, determine whether a condition for transmission of the scheduled data on an unlicensed spectrum is met, and if the condition for transmission of the scheduled data on the unlicensed spectrum is met, send the scheduled data to the base station by using the unlicensed spectrum resource.

The base station 901 is further configured to receive the scheduled data sent by the user equipment 902 by using the unlicensed spectrum resource allocated to the scheduled data by the base station 901.

In a possible implementation manner, a manner in which the user equipment 902 determines whether the condition for transmission of the scheduled data on the unlicensed spectrum is met is specifically:

the user equipment 902 is configured to obtain a priority level of the data, and determine whether the priority level is less than a preset level threshold, where if the priority level is less than the preset level threshold, the condition for transmission of the scheduled data on the unlicensed spectrum is met.

In a possible implementation manner, a manner in which the user equipment 902 determines whether the condition for transmission of the scheduled data on the unlicensed spectrum is met is specifically:

the user equipment 902 is configured to obtain a transmission delay of a radio bearer channel carrying the scheduled data, and determine whether the transmission delay is greater than or equal to a preset maximum delay, where if the transmission delay is greater than or equal to the preset maximum delay, the condition for transmission of the scheduled data on the unlicensed spectrum is met.

In a possible implementation manner, a manner in which the user equipment 902 determines whether the condition for transmission of the scheduled data on the unlicensed spectrum is met is specifically:

the user equipment 902 is configured to obtain a maximum bit rate at which the scheduled data is transmitted on a radio bearer channel carrying the scheduled data, and determine whether the maximum bit rate is less than a preset maximum bit rate, where if the maximum bit rate is less than the preset maximum bit rate, the condition for transmission of the scheduled data on the unlicensed spectrum is met.

In a possible implementation manner, at a Medium Access Control sublayer, a radio link control sublayer, or a Packet Data Convergence Protocol sublayer, the scheduled data includes control data and user data, and the control data includes a Medium Access Control control element, a radio link control status report, and a Packet Data Convergence Protocol status report.

A manner in which the user equipment 902 determines whether the condition for transmission of the scheduled data on the unlicensed spectrum is met is specifically:

the user equipment 902 is configured to determine whether the scheduled data is target data, where if the scheduled data is not the target data, the condition for transmission of the scheduled data on the unlicensed spectrum is met, where the target data includes at least one of the Medium Access Control control element, the radio link control status report, or the Packet Data Convergence Protocol status report.

In a possible implementation manner, in terms of a radio bearer, the scheduled data includes signaling radio bearer data and data radio bearer data, and the signaling radio bearer data includes a measurement report of the user equipment 902.

A manner in which the user equipment 902 determines whether the condition for transmission of the scheduled data on the unlicensed spectrum is met is specifically:

the user equipment 902 is configured to determine whether the scheduled data is the measurement report of the user equipment 902, where if the scheduled data is not the measurement report of the user equipment 902, the condition for transmission of the scheduled data on the unlicensed spectrum is met.

In a possible implementation manner, if the condition for transmission of the scheduled data on the unlicensed spectrum is not met, and the data scheduling request is sent to the user equipment 902 by the base station by using the unlicensed spectrum, the user equipment 902 is further configured to send indication information to the base station 901 by using the unlicensed spectrum resource, where the indication information is used to indicate that the scheduled data is sent to the base station 901 without using the unlicensed spectrum, or is used to indicate information about a reason for sending the scheduled data without using the unlicensed spectrum.

The base station 901 is further configured to receive the indication information sent by the user equipment 902 by using the unlicensed spectrum resource.

According to the data transmission system described in FIG. 9, user equipment transmits, to a base station by using an unlicensed spectrum resource, data that can be transmitted on an unlicensed spectrum, and avoids transmitting, to the base station by using the unlicensed spectrum resource, data that can be transmitted on a licensed spectrum, thereby improving data transmission reliability.

In an embodiment, an embodiment of the present invention further discloses a computer storage medium, where the computer storage medium stores a computer program. When the computer program in the computer storage medium is read to the computer, the computer can be enabled to complete all steps of the data transmission method disclosed in this embodiment of the present invention.

It should be noted that, for brief description, the foregoing method embodiments are represented as a combination of a sequence of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are exemplary embodiments, and the related actions and modules are not necessarily mandatory to the present invention.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The data transmission method, apparatus, and system provided in the embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. User equipment, comprising:
   a memory to store a set of program code; and
   a processor configured to invoke the program code stored in the memory to perform the following operations:
   receiving from a base station resource information allocated to scheduled data by the base station, wherein the resource information comprises an unlicensed spectrum resource;
   determining that a condition for transmission of the scheduled data on an unlicensed spectrum is met if at least one of:
   a priority level of the scheduled data is less than a preset level threshold,
   a transmission delay of a radio bearer channel carrying the scheduled data is greater than or equal to a preset maximum delay, and/or
   a maximum bit rate at which the scheduled data is transmitted on a radio bearer channel carrying the scheduled data is less than a preset maximum bit rate; and
   if the condition for transmission of the scheduled data on the unlicensed spectrum is met, sending the scheduled data to the base station by using the unlicensed spectrum resource.

2. The user equipment according to claim 1, wherein the processor is configured to:
   obtain the priority level of the scheduled data; and
   determine whether the priority level is less than the preset level threshold, wherein if the priority level is less than the preset level threshold, the condition for transmission of the scheduled data on the unlicensed spectrum is met.

3. The user equipment according to claim 1, wherein the processor is configured to:
obtain the transmission delay of the radio bearer channel carrying the scheduled data; and
determine whether the transmission delay is greater than or equal to the preset maximum delay, wherein if the transmission delay is greater than or equal to the preset maximum delay, the condition for transmission of the scheduled data on the unlicensed spectrum is met.

4. The user equipment according to claim 1, wherein the processor is configured to:
obtain maximum bit rate at which the scheduled data is transmitted on the radio bearer channel carrying the scheduled data; and
determine whether the maximum bit rate is less than the preset maximum bit rate, wherein if the maximum bit rate is less than the preset maximum bit rate, the condition for transmission of the scheduled data on the unlicensed spectrum is met.

5. The user equipment according to claim 1, wherein at a Medium Access Control sublayer, a radio link control sublayer, or a Packet Data Convergence Protocol sublayer, the scheduled data comprises control data and user data, and the control data comprises a Medium Access Control control element, a radio link control status report, and a Packet Data Convergence Protocol status report; and
the processor is configured to:
determine whether the scheduled data is target data, wherein if the scheduled data is not the target data, the condition for transmission of the scheduled data on the unlicensed spectrum is met, wherein the target data comprises at least one of the Medium Access Control control element, the radio link control status report, or the Packet Data Convergence Protocol status report.

6. The user equipment according to claim 1, wherein in terms of a radio bearer, the scheduled data comprises signaling radio bearer data and data radio bearer data, and the signaling radio bearer data comprises a measurement report of the user equipment; and
the processor is configured to:
determine whether the scheduled data is the measurement report of the user equipment, wherein if the scheduled data is not the measurement report of the user equipment, the condition for transmission of the scheduled data on the unlicensed spectrum is met.

7. User equipment, comprising:
a memory to store a set of program code; and
a processor configured to invoke the program code stored in the memory to perform the following operations:
receiving from a base station resource information allocated to scheduled data by the base station, wherein the resource information comprises an unlicensed spectrum resource;
determining whether a condition for transmission of the scheduled data on an unlicensed spectrum is met;
if the condition for transmission of the scheduled data on the unlicensed spectrum is met, sending the scheduled data to the base station by using the unlicensed spectrum resource; and
if the condition for transmission of the scheduled data on the unlicensed spectrum is not met, and the resource information allocated to the scheduled data by the base station is sent to the user equipment by the base station by using the unlicensed spectrum, sending indication information to the base station by using the unlicensed spectrum resource, wherein the indication information is used to indicate that the scheduled data is sent to the base station without using the unlicensed spectrum, or is used to indicate information about a reason for sending the scheduled data without using the unlicensed spectrum.

8. A data transmission method, comprising:
receiving, by user equipment, from a base station resource information allocated to scheduled data by the base station, wherein the resource information comprises an unlicensed spectrum resource;
determining, by the user equipment, that a condition for transmission of the scheduled data on an unlicensed spectrum is met if at least one of:
a priority level of the scheduled data is less than a preset level threshold,
a transmission delay of a radio bearer channel carrying the scheduled data is greater than or equal to a preset maximum delay, and/or
a maximum bit rate at which the scheduled data is transmitted on a radio bearer channel carrying the scheduled data is less than a preset maximum bit rate; and
if the condition for transmission of the scheduled data on the unlicensed spectrum is met, sending, by the user equipment, the scheduled data to the base station by using the unlicensed spectrum resource.

9. The method according to claim 8, wherein the determining, by the user equipment, whether a condition for transmission of the scheduled data on an unlicensed spectrum is met comprises:
obtaining, by the user equipment, the priority level of the scheduled data; and
determining, by the user equipment, whether the priority level is less than the preset level threshold, wherein if the priority level is less than the preset level threshold, the condition for transmission of the scheduled data on the unlicensed spectrum is met.

10. The method according to claim 8, wherein the determining, by the user equipment, whether a condition for transmission of the scheduled data on an unlicensed spectrum is met comprises:
obtaining, by the user equipment, the transmission delay of the radio bearer channel carrying the scheduled data; and
determining, by the user equipment, whether the transmission delay is greater than or equal to the preset maximum delay, wherein if the transmission delay is greater than or equal to the preset maximum delay, the condition for transmission of the scheduled data on the unlicensed spectrum is met.

11. The method according to claim 8, wherein the determining, by the user equipment, whether a condition for transmission of the scheduled data on an unlicensed spectrum is met comprises:
obtaining, by the user equipment, the maximum bit rate at which the scheduled data is transmitted on the radio bearer channel carrying the scheduled data; and
determining, by the user equipment, whether the maximum bit rate is less than the preset maximum bit rate, wherein if the maximum bit rate is less than the preset maximum bit rate, the condition for transmission of the scheduled data on the unlicensed spectrum is met.

12. The method according to claim 8, wherein at a Medium Access Control sublayer, a radio link control sublayer, or a Packet Data Convergence Protocol sublayer, the scheduled data comprises control data and user data, and the control data comprises a Medium Access Control control element, a radio link control status report, and a Packet Data Convergence Protocol status report; and the determining, by the user equipment, whether a condition for transmission of the scheduled data on an unlicensed spectrum is met comprises:

determining, by the user equipment, whether the scheduled data is target data, wherein if the scheduled data is not the target data, the condition for transmission of the scheduled data on the unlicensed spectrum is met, wherein the target data comprises at least one of the Medium Access Control control element, the radio link control status report, or the Packet Data Convergence Protocol status report.

13. The method according to claim 8, wherein in terms of a radio bearer, the scheduled data comprises signaling radio bearer data and data radio bearer data, and the signaling radio bearer data comprises a measurement report of the user equipment; and the determining, by the user equipment, whether a condition for transmission of the scheduled data on an unlicensed spectrum is met comprises:

determining, by the user equipment, whether the scheduled data is the measurement report of the user equipment, wherein if the scheduled data is not the measurement report of the user equipment, the condition for transmission of the scheduled data on the unlicensed spectrum is met.

14. A data transmission method, comprising:

receiving, by user equipment, from a base station resource information allocated to scheduled data by the base station, wherein the resource information comprises an unlicensed spectrum resource;

determining, by the user equipment, whether a condition for transmission of the scheduled data on an unlicensed spectrum is met;

if the condition for transmission of the scheduled data on the unlicensed spectrum is met, sending, by the user equipment, the scheduled data to the base station by using the unlicensed spectrum resource; and if the condition for transmission of the scheduled data on the unlicensed spectrum is not met, and the resource information allocated to the scheduled data by the base station is sent to the user equipment by the base station by using the unlicensed spectrum, sending, by the user equipment, indication information to the base station by using the unlicensed spectrum resource, wherein the indication information is used to indicate that the scheduled data is sent to the base station without using the unlicensed spectrum, or is used to indicate information about a reason for sending the scheduled data without using the unlicensed spectrum.

* * * * *